United States Patent
Carpenter et al.

(10) Patent No.: US 6,381,606 B1
(45) Date of Patent: Apr. 30, 2002

(54) APPLICATION PROGRAMMING INTERFACE FOR CREATING AUTHORIZED CONNECTIONS TO A DATABASE MANAGEMENT SYSTEM

(75) Inventors: Gerald LeRoy Carpenter, Apalachin; Richard Dale Housh, Vestal, both of NY (US); Steve T. Kuo, San Jose; Bruce Eric Naylor, Morgan Hill, both of CA (US); Richard Lawrence Stone, Johnson City, NY (US); Jack Chiu-Chiu Yuan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/342,010

(22) Filed: Jun. 28, 1999

(51) Int. Cl.[7] .............................................. G06F 17/30
(52) U.S. Cl. ..................... 707/100; 707/101; 707/102
(58) Field of Search .............................. 707/10, 4, 103, 707/100, 101, 102, 104; 395/727, 155; 364/513

(56) References Cited

U.S. PATENT DOCUMENTS

| | | | |
|---|---|---|---|
| 4,949,278 A | * 8/1990 | Davies et al. ................ 364/513 |
| 5,430,836 A | * 7/1995 | Wolf et al. ................... 395/155 |
| 5,596,700 A | 1/1997 | Darnell et al. |
| 5,642,515 A | * 6/1997 | Jones et al. ................... 395/727 |
| 5,752,027 A | * 5/1998 | Familiar ...................... 707/103 |
| 5,761,667 A | 6/1998 | Koeppen |
| 5,930,786 A | * 7/1999 | Carino, Jr. et al. ............. 707/4 |
| 6,009,428 A | * 12/1999 | Kleewein et al. .............. 707/10 |
| 6,052,685 A | * 4/2000 | Eastwick et al. .............. 707/10 |
| 6,240,417 B1 | * 5/2001 | Eastwick et al. .............. 707/10 |

OTHER PUBLICATIONS

Technical Data Bulletin (Serial No. TDB1192.0128), "Easy to Use PM Interface to the OS/2 Query Manager Callable Interface", IBM Corporation, Nov. 1992, (3pp).

Allan, D.J., "Abstract Data Interface", Astronomical Data Analysis Software and Systems IV, [4th Meeting], Baltimore, Sep. 25–28, 1994, Astronomical Society of the Pacific Conference Series, vol. 77, 1995, pp 199–202.

Cowan, D.D., et al., "Abstract Data Views; an Interface Specification Concept to Enhance Design for Reuse", IEEE Transaction on Software Engineering, vol. 21, No. 3, pp. 229–243, Mar. 1995, (Abstract 1pp).

Shankel, J., "Implementing Abstract Factory as an STL Container", Dr. Dobb's Journal, vol. 22, No. 12, pp 28, 32 34 100–102, Dec. 1997, (Abstract 1 pp).

* cited by examiner

Primary Examiner—Frantz Coby
(74) Attorney, Agent, or Firm—Gates & Cooper LLP

(57) ABSTRACT

A method, apparatus, and article of manufacture for accessing a database management system. An application programming interface (API) provides a plurality of simplified procedures that allow an application program executed by the computer to access a database management system (DBMS) by creating an authorized connection between the application program and the DBMS. The application program invokes the simplified procedures of the API, the invoked procedures generate at least one supervisor call (SVC) interrupt that transfers control to an SVC Service Routine, and the SVC Service Routine connects to a Cross Coupling Facility (XCF) that interfaces to an Open Transaction Manager Access (OTMA) component of the DBMS.

12 Claims, 2 Drawing Sheets

APPLICATION PROGRAMMING INTERFACE FOR CREATING AUTHORIZED CONNECTIONS TO A DATABASE MANAGEMENT SYSTEM

BACKGROUND OF THE INVENTION

1. Field of the Invention

The present invention relates generally to computerized methods for accessing databases, and in particular, to an application programming interface (API) for creating authorized connections from an application program to a database management system.

2. Description of Related Art

It is well known in the art to use database management systems, such as IBM's IMS™ (Information Management System) database management system (DBMS), to manage computerized databases. Indeed, IMS™ has been used for decades and remains in use today. Currently, there is a need to access such "legacy" databases using application programs. However, such tasks are complex and there are few tools available to assist application program developers.

IMS™ Open Transaction Manager Access (OTMA) is a high performance client/server protocol that allows application programs to access an IMS™ DBMS. However, the application program must include an interface to the IMS™ OTMA, which can be difficult to develop. To interface with an IMS™ DBMS requires rather extensive knowledge of the architecture of the IMS™ DBMS, as well as the architecture of the MVS™ operating system Moreover, because of security considerations with regard to accessing an IMS™ DBMS, a great deal of skill is involved in establishing a connection between an application program and the IMS™ DBMS, since it must interface with the operating system as a secure and trusted "user". In order to more fully provide access to an IMS™ DBMS, it would be advantageous to have an easier mechanism to connect to the IMS™ DBMS and run transactions. Thus, there is a need in the art for improved techniques for accessing a hierarchical database management system.

SUMMARY OF THE INVENTION

To overcome the limitations in the prior art described above, and to overcome other limitations that will become apparent upon reading and understanding the present specification, the present invention discloses a method, apparatus, and article of manufacture for accessing a database management system An application programming interface (API) provides a plurality of simplified procedures that allow an application program executed by the computer to access a database management system (DBMS) by creating an authorized connection between the application program and the DBMS. The application program invokes the simplified procedures of the APL the invoked procedures generate at least one supervisor call (SVC) interrupt that transfers control to an SVC Service Routine, and the SVC Service Routine connects to a Cross Coupling Facility (XCF) that interfaces to an Open Transaction Manager Access (OTMA) component of the DBMS.

Various advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown byway of illustration a specific embodiment in which the invention may be practiced. It is to be understood that other embodiments may be utilized and structural changes may be made without departing from the scope of the present invention.

Overview

The IMS™ Open Transaction Manager Access (OTMA) Callable Interface (C/I) provides a high level application programming interface (API) for application programs to access an IMS™ database management system (DBMS). The IMS™ OTMA C/I also provides easy access to an IMS™ database by creating an "authorized" path or connection with the IMS™ database. As a result, application programs accessing the data in the IMS™ DBMS can be more readily written by programmers having less familiarity with the internals of the IMS™ DBMS and operating system.

With this simple and easy to use interface, an application program can submit a transaction or command to the IMS™ DBMS and receive the results therefrom without the necessity of understanding protocols of the IMS™ OTMA. Thus, the present invention offers improved IMS™ application programming productivity

Hardware Environment

Figure 1:
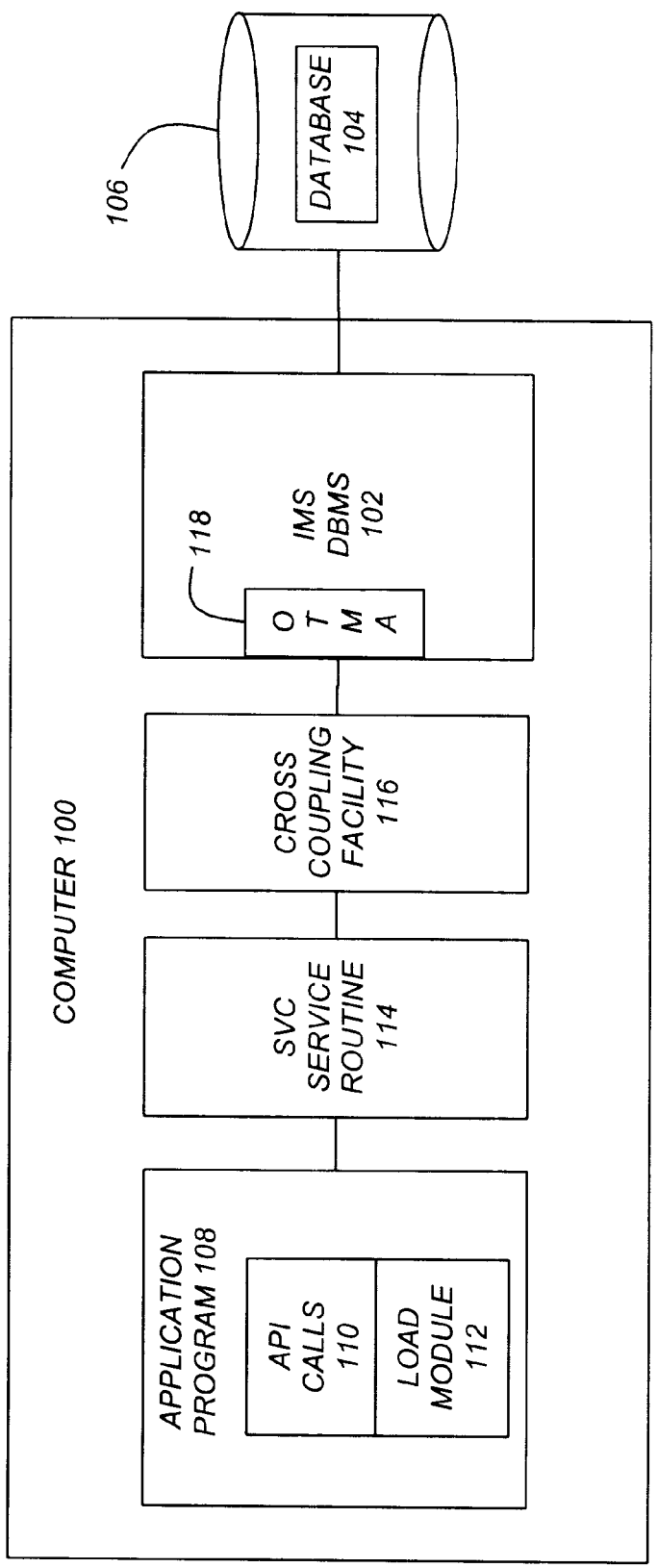
FIG. 1 is a block diagram illustrating an exemplary hardware environment used to implement the preferred embodiment of the present invention.

FIG. 1 is a block diagram illustrating an exemplary hardware environment used to implement the preferred embodiment of the invention. A computer 100 is typically comprised of one or more processors, random access memory (RAM), read-only memory (ROM), and other components such as data storage devices and data communications devices.

The computer 100 executes a database management system (DBMS) 102, which in the preferred embodiment comprises the Information Management System (IMS™) DBMS 102 sold by IBM Corporation, the assignee of the present invention. The IMS™ DBMS 102 manages one or more databases 104 stored on one or more data storage devices 106. The database 104 comprises a hierarchic collection of data, wherein information is organized in a pyramid fashion with data at each level of the hierarchy related to, and in some way dependent upon, data at the higher level of the hierarchy.

According to the preferred embodiment of the present invention, an application program 108 executed by the computer 100 interfaces to the IMS™ DBMS 102 via an IMS™ Online Transaction Manager Access (OTMA) Callable Interface (C/I), which comprises an application programming interface (API) to the IMS™ DBMS. The application program 108 performs one or more calls 110 to invoke the procedures of the API, wherein a Load Module 112 linked to the application program 108 embodies the procedures of the API. When invoked, the procedures embodied in the Load Module 112 generate at least one supervisor call (SVC) interrupt that transfers control to an SVC Service Routine 114 executed by the computer 100. The SVC Service Routine 114 connects to a Cross-Coupling Facility (XCF) 116 executed by the computer 100, that in turn interfaces to an IMS™ Online Transaction Manager Access (OTMA) 118, which is a component of the IMS™ DBMS 102. These various components perform these various steps in order to establish a connection between the application program 108 and the IMS™ DBMS 102, send transactions from the application program 108 to the IMS™ DBMS 102 over the established connection, and receive results of the transactions from the IMS™ DBMS 102 at the application program 108 over the established connection.

Generally, these components 102, 104, 108, 110, 112, 114, 116, and 118 all comprise logic and/or data that is embodied in or retrievable from a computer-readable device, medium, or carrier, e.g., a data storage device, a data communications device, a remote computer or device coupled to the computer 100 via a data communications device, etc. Moreover, this logic and/or data, when read, executed, and/or interpreted by the computer 100, causes the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media. Of course, those skilled in the art will recognize many modifications may be made to this configuration without departing from the scope of the present invention.

Those skilled in the art will recognize that any combination of the above components, or any number of different components, including different logic, data, different peripherals, and different devices, may be used to implement the present invention, so long as similar functions are performed thereby. Specifically, those skilled in the art will recognize that the present invention may be applied to any database and associated database management system.

IMS™ OTMA C/I

In the preferred embodiment of the present invention, the IMS™ OTMA C/I includes the following six procedures:
- a CREATE procedure (OTMA_CREATE) is used to create storage structures to support communications between the application program and the IMS™ DBMS,
- an OPEN procedure (OTMA_OPEN) is used to open a connection between the application program and the IMS™ DBMS,
- an ALLOCATE procedure (OTMA_ALLOC) is used to allocate an independent transaction session between the application program and the IMS™ DBMS,
- a SEND AND RECEIVE procedure (OTMA_SEND_RECEIVE) is used to send a transaction and/or command from the application program to the IMS™ DBMS and is also used to receive the output results from the IMS™ DBMS at the application program,
- a FREE procedure (OTMA_FREE) is used to free the independent transaction session between the application program and the IMS™ DBMS, and
- a CLOSE procedure (OTMA_CLOSE) is used to close the connection between the application program and the IMS™ DBMS and to release the storage structures previously allocated for the communications.

Each of these procedures are discussed in more detail below.

OTMA_CREATE

OTMA_CREATE is used to allocate storage for communications with the XCF 116 and IMS™ DBMS 102. After the call, an anchor that uniquely identifies the OTMA connection is returned to the application program 108, wherein the anchor is used for subsequent calls 110 to the API procedures.

OTMA_CREATE need not be invoked. During OTMA_OPEN, the OTMA C/I will allocate storage for communications with the XCF 116 and IMS™ DBMS 102 if it detects that OTMA_CREATE has not been called. On the other hand, if OTMA_CREATE is invoked first, the same input parameters need to be used again for the subsequent calls to OTMA_OPEN.

The input parameters for the OTMA_CREATE call include the following:
- ECB—Pointer to the next event control block.
- GROUP_NAME—Pointer to the string containing the XCF 116 group name.
- MEMBER_NAME—Pointer to the string containing the XCF 116 member name for this member.
- PARTNER_NAME—Pointer to the string containing the XCF 116 member name for the IMS™ DBMS 102.
- SESSIONS—Number of parallel sessions that are intended to be supported with the IMS™ DBMS 102.
- TRIPE_PREFIX—First 1 to 4 characters of a prefix for TPIPE names (a "transaction pipe" or transaction communications path).

The output parameters for the OTMA_CREATE call include the following:
- ANCHOR—Pointer to the anchor that uniquely identifies the OTMA connection.
- RETRSN—Pointer to the return code structure.

The return codes from the OTMA_CREATE call include the following:
- 0—The call was completed successfully.
- 8—User error.
- 12—Failure to obtain storage.

OTMA_OPEN

The application program 108 must call OTMA_OPEN to connect to the IMS™ DBMS 102, when the IMS™ DBMS 102 is available. The application program 108 must wait on the ECB that is posted when the connection is completed or when the attempt has failed because the IMS™ DBMS 102 is not executing or the OTMA 118 has not started. The application program 108 can cancel the attempt to connect with IMS™ DBMS 102 by issuing an OTMA_CLOSE call at any time, wherein the ECB is posted accordingly.

If the IMS™ DBMS 102 fails after the connection is established by the application program 108, any call 110 by the application program 108 to an API procedure will receive a return code to indicate that the IMS™ DBMS 102 is no longer listening for messages. If the IMS™ DBMS 102 resumes before an OTMA_CLOSE is performed, then the connection will be re-established without any action by the application program 108. OTMA_CLOSE and OTMA_OPEN may be called again to re-establish communications with the IMS™ DBMS 102.

The input parameters for the OTMA_OPEN call include the following:
- GROUP_NAME—Pointer to the string containing the XCF 116 group name.
- MEMBER_NAME—Pointer to the string containing the XCF 116 member name for this member.
- PARTNER_NAME—Pointer to the string containing the XCF 116 member name for the IMS™ DBMS 102.
- SESSIONS—Number of parallel sessions that are intended to be supported with the IMS™ DBMS 102.
- TPIPE_PREFIX—First 1 to 4 characters of the TPIPE names.

The output parameters for the OTMA_OPEN call include the following:
- ANCHOR—Pointer to the anchor that uniquely identifies the OTMA connection.
- RETRSN—Pointer to the return code structure.
- ECB—Pointer to the event control block to be posted when the OTMA_OPEN completes.

The application program 108 must check the ECB that was provided to OTMA_OPEN for post codes. If this ECB is not already posted, the application program 108 must wait for this ECB (i.e., for the OTMA_OPEN to complete):
- 0—The XCF 116 OPEN completed successfully.
- 4—The IMS™ DBMS 102 is not ready. Try again later.
- 8—The XCF 116 group and member are already active.
- 12—A system error occurred.

The return values for the OTMA_OPEN call include the following (the return code and reason are valid after ECB has been posted):
- 0—The XCF 116 JOIN was successful, a client-bid was sent to the OTMA 118, and an acknowledgment was received.
- 4—The IMS™ DBMS 102 is not ready. Try again later.
- 8—The XCF 116 group and member are already active.
- 12—A system error occurred.

OTMA_ALLOC

OTMA_ALLOC is called to create an independent session to exchange messages.

The input parameters for the OTMA_ALLOC call include the following:
- ANCHOR—Pointer to the anchor that uniquely identifies the OTMA connection.
- USERNAME—Pointer to the string storing the RACF ID for the transaction and/or commands.
- TRANSACTION—Name of the transaction or command to be sent to the IMS™ DBMS 102.
- SAFNAME—Pointer to the string storing the RACF group name for the transaction and/or commands.
- SPECIAL_OPTIONS—Pointer to an area codifying non-standard connection options, for example, connection profiles.

The output parameters for the OTMA_ALLOC call include the following:
- RETRSN—Pointer to return code structure.

The return values for the OTMA_ALLOC call include the following:
- 0—Success.
- 4—Session limit reached.
- 8—Null anchor.

OTMA_SEND_RECEIVE

OTMA_SEND_RECEIVE is invoked to initiate a message exchange with the IMS™ DBMS 102. The application program 108 provides buffer definitions for both send and receive information. By providing receive information at the same tire as send information, there are no unexpected messages from the IMS™ DBMS 102, thereby simplifying the protocol. When the receive information reply arrives from the IMS™ DBMS 102, the ECB will be posted.

The input parameters for the OTMA_SEND_RECEIVE call include the following:
- ANCHOR—Pointer to the anchor that uniquely identifies the OTMA connection.
- SESSION_HANDLE—Pointer to the session handle for TPIPE returned by OTMA_ALLOC.
- LTERM—Pointer to the LTERM name field. On input, this pointer is passed to the IMS™ DBMS 102. The pointer will be updated on output to the LTERM field returned by the IMS™ DBMS 102. The LTERM field can be blank in both cases.
- MODNAME—Pointer to the MODNAME name field. On input, the pointer is passed to the IMS™ DBMS 102. The pointer is updated on output to the MODNAME field returned by the IMS™ DBMS 102. The MODNAME field may be blank in both cases.
- SEND_BUFFER—Pointer to the buffer containing data to be sent to the IMS™ DBMS 102. This buffer does not include the transaction name. The client code must provide the transaction name for the data in this buffer when sending to the IMS™ DBMS 102.
- SEND_LENGTH—Length of SEND_BUTFFER.
- SEND_SEGMENT_LIST—An array of lengths of message segments to be sent to the IMS™ DBMS 102. The first element is a count of the number of following segment lengths. If a single segment is to be sent, either the first element or the address of the list can be zero.
- RECEIVE_BUFFER—Pointer to the buffer to receive the reply from the IMS™ DBMS 102.
- RECEIVE_LENGTH—Length of buffer available to receive message.
- RECEIVE_SEGMENT_LIST—An array to hold the number of segments sent by the IMS™ DBMS 102. The first element is the number of elements in the array. If a single segment is to be received, either the first element or the address of the array can be zero, in which case all segments will be received contiguously without any indication of segmentation boundaries.
- RECEIVED_LENGTH—The total of available message segment lengths.
- CONTEXT_ID—A distributed sync point context ID or null.

The output parameters for the OTMA_SEND_RECEIVE call include the following:
- RETRSN—Pointer to the return code structure.
- ECB—Event Control Block to be posted when the message exchange is complete.

RECEIVED_LENGTH—Field to receive length of received data. RECEIVE_BUFFER—Should be equal to the sum of the segment lengths.

RECEIVE_SEGMENT_LIST—An array of lengths of message segments received from the IMS™ DBMS 102. The first element is a count of the following segment lengths and must be set by the application program 108 to indicate the maximum length of array. It will be modified by the receive function.

ERROR_MESSAGE—Provided by the application program to receive error messages from the IMS™ DBMS 102.

OTMA_FREE

OTMA_FREE is called to free an independent session created by OTMA_ALLOC.

The input parameters for the OTMA_FREE call include the following:

ANCHOR—Pointer to the anchor that uniquely identifies the OTMA connection.

SESSION_HANLE—Pointer to a session handle returned by OTMA_ALLOC.

The output parameters for the OTMA_FREE call include the following:

RETRSN—Pointer to return code structure.

SESSION_HANDLE—Pointer to the session handle will be nulled by OTMA_FREE.

The return values for the OTMA_FREE call include the following:

0—Success.
4—Not allocated session.
8—Incorrect anchor.

OTMA_CLOSE

OTMA_CLOSE is called to free storage for communication and to leave the XCF 116 group. This function may be called when communications are underway or an OTMA_OPEN is being processed. In these cases, all relevant ECBs will be posted with a canceled post code.

The input parameters for the OTMA_CLOSE call include the following:

ANCHOR—Pointer to the anchor that uniquely identifies the OTMA connection.

The output parameters for the OTMA_CLOSE call include the following:

RETRSN—Pointer to return code.

The return values for the OTMA_CLOSE call include the following:

0—Success.
4—Null anchor.
8—Cannot leave XCF group.

POST_CODES

The asynchronous nature of calls to OTMA_OPEN and OTMA_SEND-RECEIVE requires that the application program 108 use event signaling methods. Note that the other API procedures are synchronous.

OTMA_OPEN and OTMA_SEND_RECEIVE each have an ECB parameter. This application program 108 must check this ECB and wait for it to be posted before releasing or inspecting any of the output fields mentioned in the API procedure, except for the return code in the return code structure. The return code from both OTMA_OPEN and OTMA_SEND-RECEIVE indicates failure to initiate communications with a non-zero value. (The ECB has the same value in these cases.)

The general meanings of the POST codes are as follow:

0—Data transfer or state change expected is completed.
4—Transient problem detected. Try again later.
8—User error.
12—System error.
16—The application program 108 or XCF 116 has aborted the function.
20—Error returned from the IMS™ DBMS 102.

Logic of the IMS™ OTMA C/I

Figure 2:
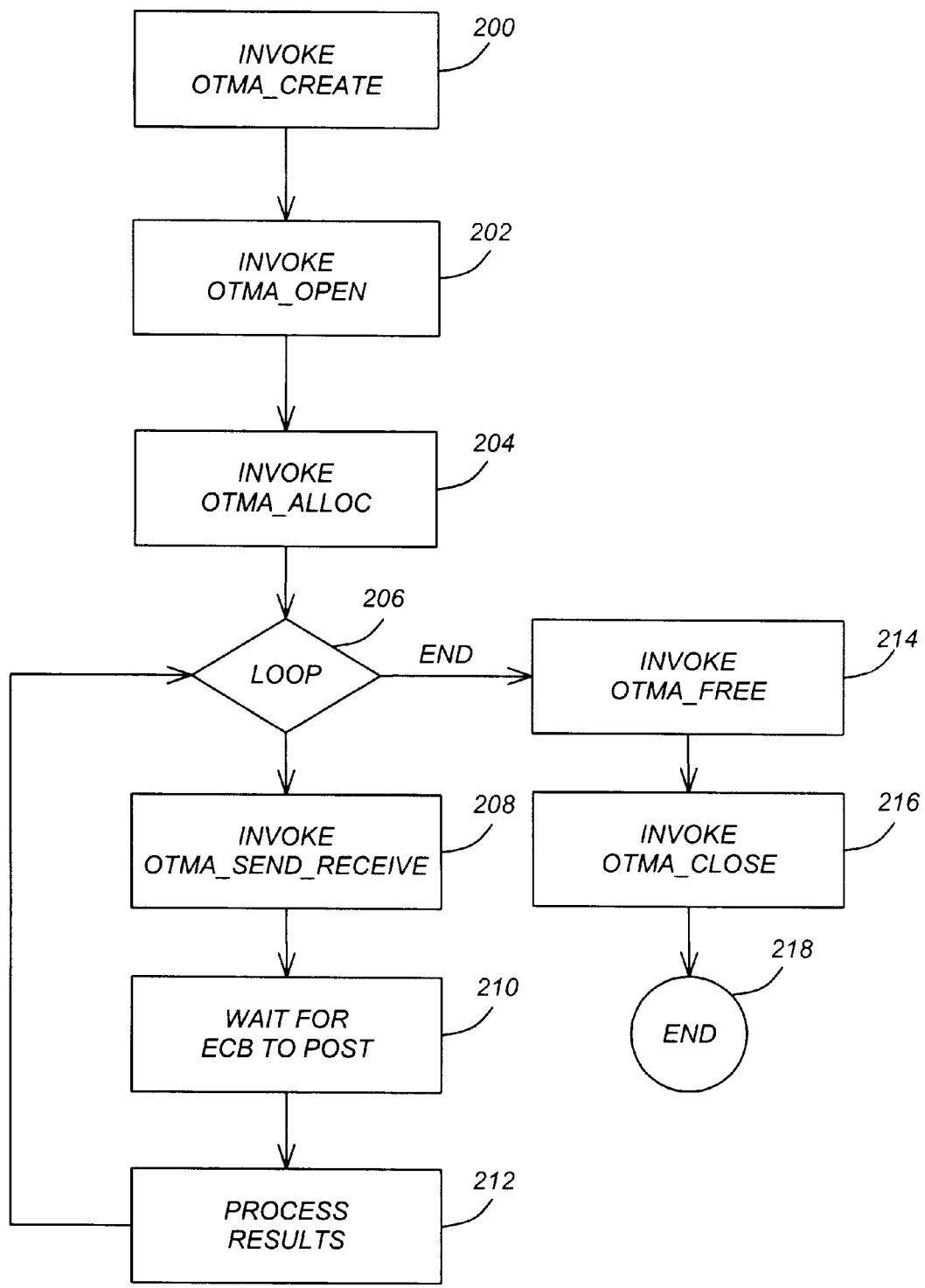
FIG. 2 is a flowchart illustrating the steps performed according to the preferred embodiment of the present invention.

FIG. 2 is a flow chart illustrating the logic performed according to the preferred embodiment of the present invention.

Block 200 represents the application program 108 invoking OTMA_CREATE to create storage structures to support communications between the application program 108 and the IMS™ DBMS 102.

Block 202 represents the application program 108 invoking OTMA_OPEN to open a connection between the application program 108 and the IMS™ DBMS 102.

Block 204 represents the application program 108 invoking OTMA_ALLOC to allocate an independent transaction session between the application program 108 and the IMS™ DBMS 102.

Blocks 206–212 are a loop that represents the application program 108 sending commands to the IMS™ DBMS 102 and receiving the output results from the IMS™ DBMS 102. Specifically, Block 206 is a loop indicator, Block 208 represents the application program 108 invoking OTMA_SEND_RECEIVE to send a transaction to the IMS™ DBMS 102, Block 210 represents the application program 108 waiting for the ECB to be posted to indicate that a response has been received, and Block 212 represents the application program 108 processing the output results from the IMS™ DBMS 102. The loop at Block 206 may be repeated by the application program 108 as required.

Block 214 represents the application program 108 invoking OTMA_FREE to free he independent transaction session between the application program 108 and the IMS™ DBMS 102.

Block 216 represents the application program 108 invoking OTMA_CLOSE to close the connection between the application program 108 and the IMS™ DBMS 102 and to release the storage structures previously allocated for the communications.

Thereafter, the logic terminates at Block 218.

CONCLUSION

This concludes the description of the preferred embodiment of the invention. The following describes some alternative methods of accomplishing the same objects.

In alternative embodiments of the present invention, other types and configurations of computers could be used. For example, mainframes, minicomputers, or personal computers, could be used with the present invention.

In alternative embodiments of the present invention, other types and configurations of computer programs could be used. For example, the invention need not be restricted to client-server configurations.

In alternative embodiments of the present invention, other database management systems could be used. For example, the invention need not be restricted to IMS™ database management systems and databases.

In summary, the present invention discloses a method, apparatus, and article of manufacture for accessing a database management system. An application programming interface (API) provides a plurality of simplified procedures that allow an application program executed by the computer to access a database management system (DBMS) by creating an authorized connection between the application program and the DBMS. The application program invokes the simplified procedures of the API, the invoked procedures generate at least one supervisor call (SVC) interrupt that transfers control to an SVC Service Routine, and the SVC Service Routine connects to a Cross Coupling Facility (XCF) that interfaces to an Open Transaction Manager Access (OTMA) component of the DBMS.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for accessing a database management system, comprising:

an application programming interface (API), executed by a computer, for providing a plurality of simplified procedures that allow an application program executed by the computer to access a database management system (DBMS) by creating an authorized connection between the application program and the DBMS, wherein the application program invokes the simplified procedures of the API, the invoked procedures generate at least one supervisor call (SVC) interrupt that transfers control to an SVC Service Routine executed by the computer, and the SVC Service Routine connects to an Cross Coupling Facility (XCF) executed by the computer that interfaces to an Open Transaction Manager Access (OTMA) component of the DBMS, in order to establish a connection between the application program and the DBMS, send transactions from the application program to the DBMS over the established connection, and receive results of the transactions at the application program from the DBMS over the established connection;

wherein the procedures include a CREATE procedure for creating storage structures to support communications between the application program and the DBMS, an OPEN procedure for opening a connection between the application program and the DBMS, an ALLOCATE procedure for allocating an independent transaction session between the application program and the DBMS, a SEND AND RECEIVE procedure for sending at least one command to the DBMS and for receiving output from the DBMS, a FREE procedure for releasing the independent transaction session between the application program and the DBMS, and a CLOSE procedure for closing the connection between the application program and the DBMS.

2. The apparatus of claim 1, wherein the DBMS comprises an Information Management System (IMS).

3. The apparatus of claim 1, wherein authorized and non-authorized application programs send commands to the DBMS.

4. The apparatus of claim 1, wherein the procedures are embodied in a load module linked to the application program.

5. A method for accessing a database management system, comprising:

invoking one or more procedures of an application programming interface (API) executed by a computer, wherein the API provides a plurality of simplified procedures that allow an application program executed by the computer to access a database management system (DBMS) by creating an authorized connection between the application program and the DBMS;

generating at least one supervisor call (SVC) interrupt from the invoked procedure, wherein the SVC interrupt transfers control to an SVC Service Routine executed by the computer; and connecting the SVC Service Routine to a Cross Coupling Facility (XCF) executed by the computer, wherein the XCF interfaces to a Open Transaction Manager Access (OTMA) component of the DBMS;

thereby establishing a connection between the application program and the DBMS, so that transactions can be sent from the application program to the DBMS over the established connection, and results of the transactions can be received from the DBMS at the application program over the established connection;

wherein the procedures include a CREATE procedure for creating storage structures to support communications between the application program and the DBMS, an OPEN procedure for opening a connection between the application program and the DBMS, an ALLOCATE procedure for allocating an independent transaction session between the application program and the DBMS, a SEND AND RECEIVE procedure for sending at least one command to the DBMS and for receiving output from the DBMS, a FREE procedure for releasing the independent transaction session between the application program and the DBMS, and a CLOSE procedure for closing the connection between the application program and the DBMS.

6. The method of claim 5, wherein the DBMS comprises an Information Management System (IMS).

7. The method of claim 5, wherein authorized and non-authorized application grams send commands to the DBMS.

8. The method of claim 5, wherein the procedures are embodied in a load module linked to the application program.

9. An article of manufacture embodying an application programming interface (API) that is executed by a computer, wherein the API includes a plurality of simplified procedures that allow an application program executed by the computer to access a database management system (DBMS) by creating an authorized connection between the application program and the DBMS, wherein the application program invokes the simplified procedures of die API, the invoked procedures generate at least one supervisor call (SVC) interrupt that transfers control to an SVC Service Routine executed by the computer, and the SVC Service Routine connects to a Cross Coupling Facility (XCF) executed by the computer that interfaces to an Open Transaction Manager Access (OTMA) component of the of the DBMS, in order to establish a connection between the application program and the DBMS, send transactions from the application program to the DBMS over the established connection, and receive results of the transactions at the application program from the DBMS over the established connection;

wherein the procedures include a CREATE procedure for creating storage structures to support communications between the application program and the DBMS, an OPEN procedure for opening a connection between the application program and the DBMS, an ALLOCATE procedure for allocating an independent transaction session between the application program and the DBMS, a SEND AND RECEIVE procedure for sending at least one command to the DBMS and for receiving output from the DBMS, a FREE procedure for releasing the independent transaction session between the application program and the DBMS, and a CLOSE procedure for closing the connection between the application program and the DBMS.

10. The article of manufacture of claim 9, wherein the DBMS comprises an Information Management System (IMS).

11. The article of manufacture of claim 9, wherein authorized and non-authorized application programs send commands to the DBMS.

12. The article of manufacture of claim 9, wherein the procedures are embodied a load module linked to the application program.

* * * * *